F. C. VOGLER.
VEHICLE WHEEL.
APPLICATION FILED SEPT. 28, 1916.

1,242,278. Patented Oct. 9, 1917.

WITNESSES:
Will N. Noonan
Harry B. Rook.

INVENTOR.
FRANK C. VOGLER
H. S. Hill ATTORNEY

UNITED STATES PATENT OFFICE.

FRANK CLAMPETT VOGLER, OF SAN ANTONIO, TEXAS.

VEHICLE-WHEEL.

1,242,278.

Specification of Letters Patent.

Patented Oct. 9, 1917.

Application filed September 28, 1916. Serial No. 122,678.

*To all whom it may concern:*

Be it known that I, FRANK CLAMPETT VOGLER, a citizen of the United States, residing at San Antonio, in the county of Bexar, State of Texas, have invented a new and useful Vehicle-Wheel; and I do hereby declare the following to be a full, clear, and exact description of the invention, such as will enable others skilled in the art to which is appertains to make and use the same.

The present invention relates to certain new and useful improvements in vehicle wheels, and has for its object to provide a device of this character which is formed with a sectional felly, and embodies novel features of construction whereby the felly can be readily removed from position, or quickly assembled and expanded into a tight engagement with the rim, without the aid of a blacksmith or the necessity of using any special tools or appliances.

Further objects of the invention are to provide a wheel of this character which is comparatively simple and inexpensive in its construction, which will not work loose under the constant vibration which is incident to the use of the wheel upon a vehicle, which provides a sectional felly in which the parts are interchangeable so that a damaged part can readily be replaced at small expense, and which enables any looseness to be readily taken up at any time.

With these and other objects in view the invention consists in certain novel combinations and arrangements of the parts as will more fully appear as the description proceeds, the novel features thereof being pointed out in the appended claims.

For a full understanding of the invention, reference is to be had to the following description and accompanying drawing, in which:—

Corresponding and like parts are referred to in the following description and indicated in all the views of the drawings by the same reference characters.

Figure 1:
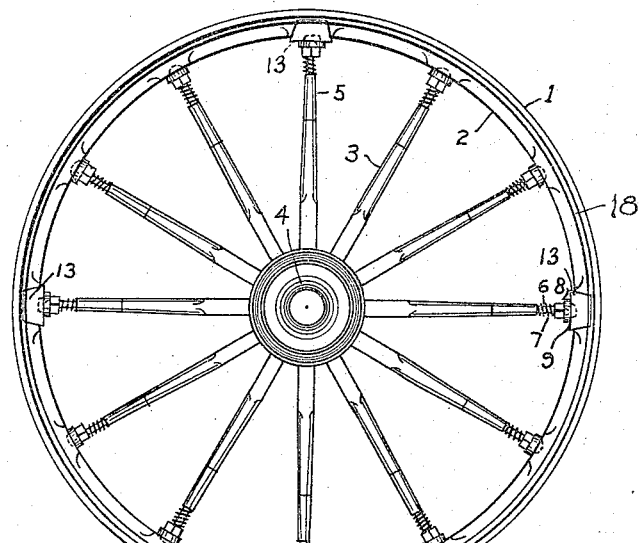
Figure 1 is a side elevation of a wheel constructed in accordance with the invention.
Figure 3:
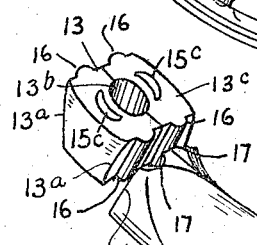
Fig. 3 is a detail perspective view of one of the wedge blocks and the adjacent end portion of one of the segmental felly sections.
Figure 6:
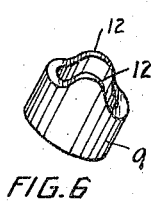
Fig. 6 is a detail perspective view of one of the follower sleeves.
Figure 2:
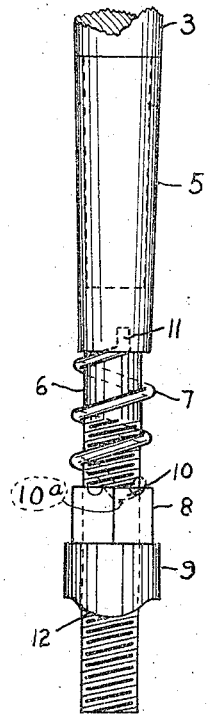
Fig. 2 is an enlarged detail view of the outer end of one of the spokes.
Figure 5:
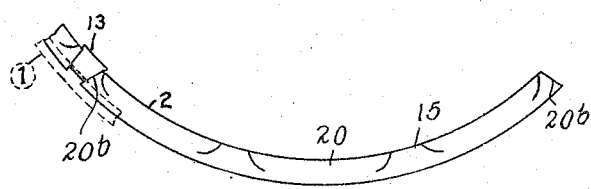
Fig. 5 is a side elevation of a portion of the felly and one of the wedge blocks, showing the operative position of the latter, when the wheel is new.
Figure 4:
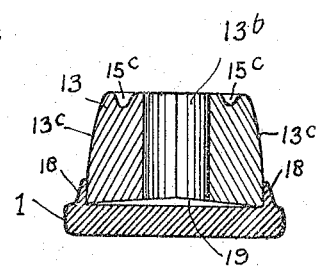
Fig. 4 is an enlarged transverse sectional view through one of the wedge blocks and the rim.

The numeral 1 designates the rim which is formed with inwardly extending side flanges 18, 2 the felly, 3 the spokes, and 4 the hub member to which the inner ends of the spokes are rigidly attached, and from which the spokes project radially. Caps 5 are fitted upon the outer ends of the spokes 3, said caps being provided with reduced threaded spindles 6 upon which clamping nuts 8 are mounted. Follower sleeves 9 are slidably mounted upon the spindles 6 and adapted to be forcibly moved outwardly by the clamping nuts 8 when expanding the felly into engagement with the rim. Coil springs 7 surround the spindles 6 and are interposed between the nuts 8 and the shoulders at the inner ends of the spindles. A finger 11 at the inner end of each spring engages a recess in the shoulder at the end of the cap 5 to lock the spring against rotation upon the spindle, while the outer end of the spring terminates in a rounded nose 10 adapted to yieldably engage any one of a series of depressions $10^a$ in the nut 8 to hold the latter against accidental rotation.

The felly 2 is formed in a series of independent segmental sections having wedge blocks 13 interposed between the ends thereof. Each of these segmental felly sections is divided longitudinally and composed of two complemental felly elements 20, all of the said felly elements being interchangeable and being adapted to be shifted from one side of the wheel to the opposite side thereof by reversing the ends of the elements. These felly elements 20 are formed at suitable intervals upon their inner faces with corresponding radial grooves arranged for coöperation with each other to provide openings 14 for the reception of the outer ends of the spindles 6. Seats 15 are provided adjacent the openings 14 for engagement with the outer ends of the follower sleeves 9, said seats being formed with depressions 15ª for the reception of ears 12 upon the followers 9. The ears 12 are thus enabled to obtain a secure hold upon the complemental felly elements 20 for the purpose of preventing separation thereof. The pressure of the follower 9 against the seats 15 has a toggle action and tends to laterally expand the outer edges 20ª of the felly elements into a firm engagement with the inwardly extending side flanges 18 of the rim 1.

The wedge blocks 13 are formed with inclined sides 13ª adapted to coöperate with the correspondingly inclined ends 20ᵇ of the felly elements to force the felly sections apart and radially expand the felly into a tight engagement with the rim 1. It will also be observed that the inclined sides 13ª of the wedge blocks are formed with ribs 16 which are adapted to engage grooves 17 in the various felly elements 20 to produce an interlocking connection therewith and prevent spreading of the felly elements at the ends of the segmental felly sections. Each of the wedge blocks 13 is formed with a central opening 13ᵇ to receive the corresponding spindle 6, and these wedge blocks are divided longitudinally into the complemental and interchangeable sections 13ᶜ, said sections being formed in their inner faces with depressions 15ᶜ adapted to be engaged by the ears 12 of the follower sleeve 9, while the outer faces of the sections are beveled at 19 so that the pressure of the follower sleeve will tend to laterally expand the wedge block into engagement with the side flanges 18 of the rim 1.

In assembling the wheel the clamping nuts 8 are screwed inwardly upon the threaded spindles 6, the tire 1 placed loosely in position, and the various felly elements 20 and wedge blocks 13 assembled in position within the rim. The nuts 8 are then screwed outwardly and the follower sleeves 9 caused to forcibly engage the seats 15 of the felly sections and the inner faces of the wedge blocks 13. As the wedge blocks are forced outwardly the felly is radially expanded into a firm engagement with the rim 1, and the pressure of the follower sleeves serves to laterally expand the bases of both the felly sections and the wedge blocks into engagement with the flanges 18 of the rim, thereby providing a very rigid construction. The springs 7 lock the clamping nuts 8 against accidental rotation, so that there is no danger of the wheel working loose under the action of the constant vibration to which it is subjected when in use. Should any part of the wheel become broken or damaged, it can be easily repaired or replaced by a new part, without dismounting the entire wheel. It will also be obvious that any necessary repairs or alterations can be made with the use of an ordinary wrench, and that the services of a blacksmith are quite unnecessary.

Figure 7:
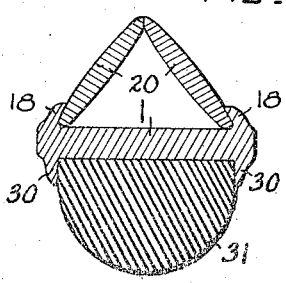
Fig. 7 is a detail sectional view showing a slight modification in which provision is made for mounting a rubber tire upon the rim.

A slight modification is shown by Fig. 7, in which the rim 1 is shown as provided with outwardly projecting side flanges 30 for engagement with a rubber tire 31. In all other respects the construction and manner of operation is identical with that just described.

The parts are preferably constructed so that the wedge blocks 13 are spaced from the rim and project slightly inwardly from the felly sections when the wheel is new. This allows for forcing the wedge blocks farther out as may become necessary owing to wear and shrinkage of the parts after the wheel has been in use for a considerable period of time.

Having thus described the invention, what I claim as new and desire to secure by Letters Patent, is:—

1. A wheel including a rim, segmental felly sections divided longitudinally to form complemental felly elements, wedge blocks between the felly sections, and means for forcing the wedge blocks and felly sections outwardly and holding the felly elements together.

2. A wheel including a rim, segmental felly sections divided longitudinally to form complemental felly elements, wedge blocks interposed between the ends of the felly sections and having an interlocking connection with the felly elements to prevent spreading of the latter, and means for forcing the wedge blocks outwardly.

3. A wheel including a rim, segmental felly sections divided longitudinally to form complemental felly elements, wedge blocks fitted between the ends of the segmental felly sections and also divided longitudinally, the wedge block sections having an interlocking connection with corresponding felly elements, and means for forcing the wedge blocks outwardly and holding the sections thereof together.

4. A wheel including a rim, segmental felly sections divided longitudinally to form complemental felly elements, seats being provided on the inner faces of the felly sections, wedge blocks fitted between the ends of the felly sections, spokes, spindles projecting from the spokes, followers slidable on the spindles and arranged for engagement with the wedge blocks and seats of the felly sections, means upon the followers for engaging the complemental elements of each felly section to hold them together, and means for forcing the followers outwardly on the spindles.

5. A wheel including a rim, segmental felly sections divided longitudinally to form complemental felly elements, seats being provided upon the inner faces of the segmental felly sections, wedge blocks fitted between the ends of the segmental felly sections and also divided longitudinally, the wedge block sections having interlocking connections with the ends of corresponding felly elements, spokes, spindles projecting from the spokes, followers slidable upon the spindles for engagement with the wedge blocks and seats of the felly sections, means upon the followers for holding the wedge block sections and felly elements together, and means for forcing the followers outwardly upon the spindles.

6. A wheel including a rim provided with inwardly extending flanges, segmental felly sections divided longitudinally to form complemental felly elements which are beveled on the inner edges of the outer faces so as to be wedged apart and forced into a firm engagement with the rim flanges when outward pressure is exerted thereon, wedge blocks fitted between the segmental felly sections, and means for exerting an outward pressure upon the wedge blocks and felly sections.

7. A wheel including a rim provided with inwardly extending flanges, segmental felly sections divided longitudinally to form complemental felly elements which are beveled on the inner edges of their outer faces so as to be wedged apart and forced into a firm engagement with the flanges of the rim when an outward pressure is exerted upon the felly, wedge blocks fitted between the ends of the felly sections, spokes, spindles projecting from the spokes, followers slidable upon the spindles and arranged for engagement with the wedge blocks and felly sections, means for forcing the followers outwardly, and means upon the followers for engaging the felly elements to prevent separation thereof.

8. A wheel including a rim formed with inwardly extending flanges, segmental felly sections divided longitudinally to form complemental felly elements which are beveled on the inner edges of their outer faces so as to be wedged outwardly and forced into a tight engagement with the flanges of the rim when an outward pressure is exerted upon the felly, wedge blocks fitted between the ends of the felly sections and also divided longitudinally, the wedge block sections having interlocking connections with the corresponding felly elements, spokes, spindles projecting from the spokes, followers slidable upon the spindles and arranged for engagement with the wedge blocks and felly elements, means for forcing the followers outwardly, and means upon the followers for holding the wedge block sections and felly elements together.

9. A wheel, including a rim provided with inwardly extending flanges, segmental felly sections divided longitudinally to form complemental felly elements which are beveled on the inner edges of the outer faces thereof so as to be wedged apart and forced into engagement with the flanges of the rim when an outward pressure is exerted upon the felly sections, wedge blocks fitted between the felly sections and also divided longitudinally, the sections thereof being beveled on the inner edges of their outer faces, spokes, spindles projecting from the spokes, followers slidable upon the spindles and arranged for engagement with the wedge blocks and felly sections, means for forcing the followers outwardly, and means upon the followers for holding the wedge block sections and felly elements together.

10. A wheel including a rim provided with inwardly extending flanges, segmental felly sections divided longitudinally to form complemental felly elements which are beveled on the inner edges of their outer faces so as to be wedged apart and forced into engagement with the flanges of the rim when an outward pressure is exerted upon the felly sections, wedge blocks fitted between the felly sections and also divided longitudinally, inner edges of the outer faces of the wedge block sections being also beveled and the wedge block sections having tongue and groove connections with the corresponding felly elements, spokes, spindles projecting from the spokes, followers slidable upon the spindles and arranged for engagement with the wedge blocks and felly sections, means for forcing the followers outwardly, and means upon the followers for preventing separation of the wedge block sections and felly elements.

In testimony whereof I have signed my name to this specification in the presence of two subscribing witnesses.

FRANK CLAMPETT VOGLER.

Witnesses:
N. G. RAMBIE,
JOE FREES.

Copies of this patent may be obtained for five cents each, by addressing the "Commissioner of Patents, Washington, D. C."